Patented May 20, 1930

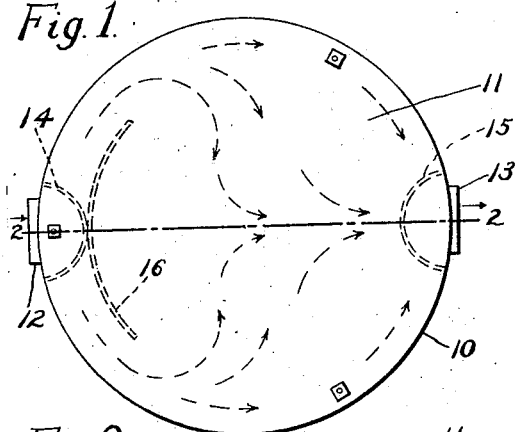
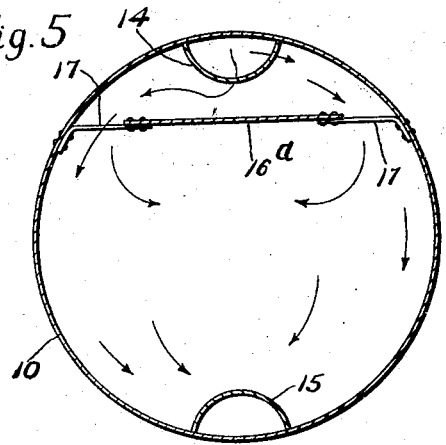
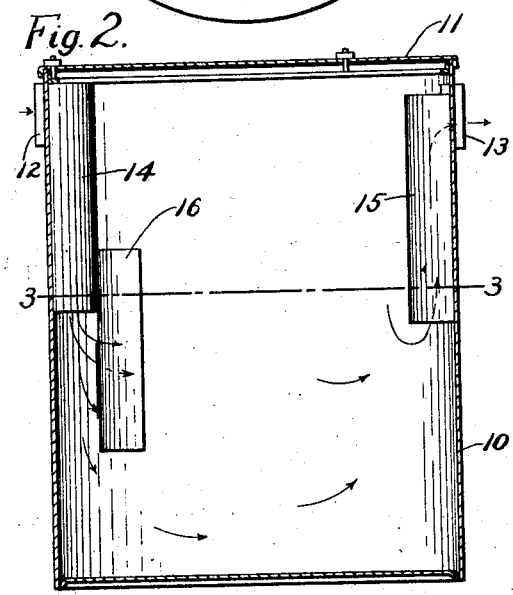
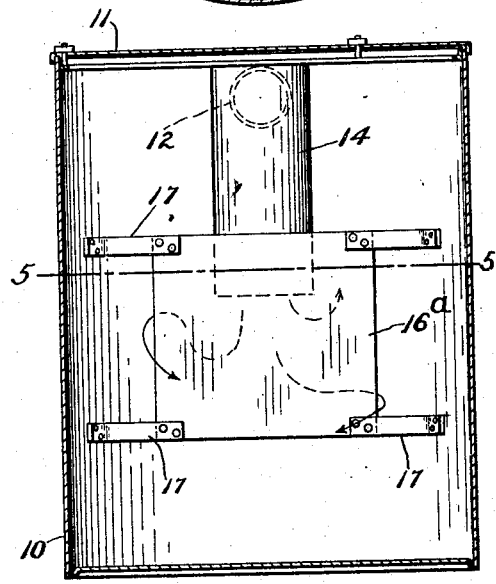
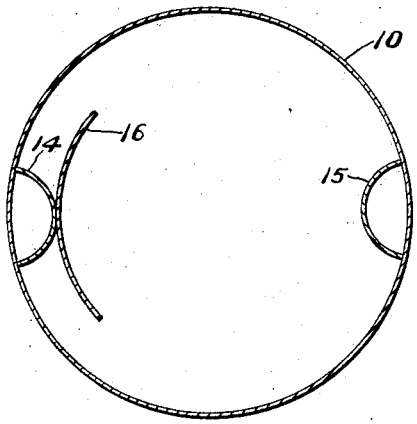

1,759,334

UNITED STATES PATENT OFFICE

FREDERICK E. WILSON, OF BUFFALO, NEW YORK

SEPTIC TANK

Application filed September 1, 1926. Serial No. 132,970.

This invention relates to septic tanks for the treatment of sewage, in which the heavier and lighter parts of the sewage are separated and subjected to changes due to bacteriological action within the tank.

An object of the invention is to provide an improved septic tank which will effectively treat sewage in the desired manner, with which the capacity of the tank is utilized to the best advantage, which will have a minimum number of parts, which will, to a maximum extent, utilize simple and easily constructed forms of containers and parts, with which the interior will be readily accessible for cleaning or inspection, which may be constructed in the factory and shipped ready for use, and which is simple, durable, efficient, compact, and relatively inexpensive.

Various other objects and advantages will be apparent from the following description of an embodiment of the invention, and the novel features will be particularly pointed out hereinafter in connection with the appended claims.

In the accompanying drawings,

Fig. 1 is a plan of a tank constructed in accordance with the invention;

Fig. 2 is a sectional elevation of the tank, with the section taken approximately along the line 2—2 of Fig. 1;

Fig. 3 is a sectional plan of the same, with the section taken approximately along the line 3—3 of Fig. 2;

Fig. 4 is a sectional elevation through a tank also constructed in accordance with the invention, but illustrating another embodiment thereof; and Fig. 5 is a sectional plan of the same, with the section taken approximately along the line 5—5 of Fig. 4.

In the embodiment of the invention illustrated in Figs. 1 to 3, a casing 10 of any suitable size or shape is provided with a removable closure 11 for its upper open end. The casing and cover are both preferably formed from sheet metal, and the casing is preferably made cylindrical because such forms are less expensive to manufacture and are very satisfactory as septic tanks. The casing is provided, adjacent its upper open end, with an inlet opening surrounded by a flange 12, and an outlet opening surrounded by a flange 13. The inlet pipe carrying the liquid or sewage to be disposed of or treated is connected to the flange 12 and the outlet pipe which carries away the treated sewage is connected to the flange 13. These inlet and outlet flanges 12 and 13 are spaced apart peripherally of the tank, preferably at opposite points.

A cylindrical segment shell 14 is fitted against the inner surface of the side wall of the casing 10, so as to extend downwardly from the inlet flange 12, with the concave or open side of the segment facing the inner face or wall of the casing. Similarly a cylindrical segment shell 15 is fitted against the side wall of the casing, with its open side facing the inner surface of the side wall of the casing, and extending downwardly from the outlet flange 13. The two cylindrical segment shells 14 and 15 may be secured against the casing wall in any suitable manner such as by welding the vertical edges of the shells to the casing wall. The cylindrical segment shells, together with the casing walls against which they fit, serve as inlet and outlet conduits extending downwardly into the interior of the casing. Both of these conduits thus formed extend below the maximum level of liquid which is formed in the casing, this level being determined by the outlet opening 13.

These two conduits also terminate above the bottom wall, and normally the liquid entering through the conduit formed by the shell 14 would normally pass directly across the casing and out through the outlet conduit. Consequently there would be very little movement along the inner wall of the casing. Accordingly another partially cylindrical or arcuate shell 16, which is in the form of a concave plate, is secured with its convex edge against the shell 14, so as to extend upwardly and downwardly and at each side of the lower open end of the inlet conduit. Preferably the baffle plate 16 thus formed has its axis of curvature at approximately the axis of the casing, so that the passages formed between it and the side wall of the casing will be approximately uniform in size throughout their lengths.

When the ingoing liquid enters the casing from the open lower end of the inlet conduit, the baffle plate 16 will direct it sidewise and downwardly, and therefore a portion of the ingoing liquid will be conducted closely along the side walls of the casing for some distance, which will tend to keep the liquid in the casing moving along the side walls as well as through the center of the casing. Hence all the liquid in the casing will be subjected to about equal treatment. The removal of the outgoing liquid from the body of the liquid at a point below its maximum level, will not cause any breakage of the scum formed on the top of the body of liquid or the sewage in the casing, and therefore the anaerobic bacterial action which must proceed in the substantial absence of air will not be interfered with.

Referring now particularly to the embodiment of the invention illustrated in Figs. 4 and 5, the casing 10 and its cover 11 are the same as in the embodiment of the invention shown in Figs. 1 to 3. The baffle plate 16ᵃ, which may be flat or arcuate, however, instead of being secured directly to the inlet conduit formed by the shell 14, is slightly spaced from the same, and supported in front of it, and may be mounted in this spaced relation in any suitable manner, such as by bracket arms 17 which connect the baffle plate with the side walls of the casing, being suitably secured to both of the same such as by welding or by rivets. The position of the baffle plate 16ᵃ is similar in other respects to that of the baffle plate 16 of Figs. 1 to 3 and the action is substantially the same in that it directs the ingoing liquid which is deposited in the interior of the body of liquid in the casing, sidewise as well as in other directions. Hence the ingoing liquid will move along the side walls of the casing as well as through the interior, and the sewage or liquid throughout the casing will be given substantially equal treatment. The maximum possible bacterial action on the sewage will be obtained in a minimum of volume, since all of the casing will be utilized effectively in the bacterial action.

While the plates 16 and 16ᵃ have been illustrated and described as placed adjacent the inlet in order to cause immediate diffusion of the ingoing sewage and direction of a portion of the same along the side walls of the casing, it will be understood that the direction of flow through the casing may be reversed by admitting the sewage through the opening defined by the flange 13 and removing it through the opposite opening defined by the flange 12. In this latter case the plates 16 and 16ᵃ serve to cause a similar travel of the sewage along the sides of the casing.

In both of the embodiments of the invention which have been illustrated, it will be noted that the ingoing liquid and the outgoing liquid communicate with the body of liquid in the casing part way between the maximum liquid level and the bottom of the casing, and the single baffle plate disposed opposite and in front of the inlet opening serves to spread the ingoing liquid quite uniformly through the casing, with a resulting maximum efficiency of the given volume of the tank. It will also be noted that the casing is cylindrical in form, which is the simplest and least expensive form in which a sheet metal container may be made. The baffle plate and the shells 14 and 15 with which the casing serve to form inlet and outlet conduits are simple forms of sheet material easily formed in rolling machines, and then welded or otherwise secured in position. Such a tank has been found to be particularly effective and uniform in its action and for the reasons above mentioned is relatively compact and inexpensive.

It will be obvious that various changes in the details, which have been herein described and illustrated in order to explain the nature of the invention, may be made by those skilled in the art within the principle and scope of the invention as expressed in the appended claims.

Claims:—

1. A septic tank comprising a casing having an inlet and an outlet, both opening into the interior of the casing at points adjacent the casing wall and below the maximum level of liquid in the casing as determined by the outlet, and a baffle wall disposed in said casing closely adjacent one of said openings into the casing and extending laterally therefrom but for the major portion of both of its vertical edges spaced from the side walls of the casing to permit passage around both of its side edges of a liquid passing through said casing.

2. A septic tank comprising a casing having an inlet and an outlet, both opening into the interior of the casing at points below the maximum level of the liquid in the casing as determined by the outlet, and a baffle wall mounted in said casing closely adjacent one of the openings into the casing and disposed transversely across the direct path of flow between said openings, the baffle wall extending for some distance in all directions from the opening adjacent thereto and terminating below the upper level of liquid in the casing and with its edges substantially all spaced from the casing walls, whereby liquids passing through the casing will be diffused partially along the sides of the casing.

3. A septic tank comprising a casing having an inlet and an outlet, both opening into the casing at points below the maximum level of the liquid in the casing as determined by the outlet, the inlet opening into the casing through a downwardly opening conduit closely adjacent the casing wall, and a baffle wall disposed in the casing in front of and closely adjacent to the opening from the inlet into the casing, with its side edges spaced largely from the side and bottom walls of the casing, said baffle wall extending across an otherwise direct path between the inlet and outlet for causing diffusion throughout the casing and along its walls of the ingoing liquid.

4. A septic tank comprising a cylindrical casing having an outlet determining the maximum level of liquid in said casing, an inlet conduit extending downwardly within the casing and opening downwardly into the casing at a point below the maximum level of the liquid in the casing and above the bottom of the casing, and a baffle plate secured to the inlet conduit and extending in opposite directions laterally therefrom in spaced relation to the casing walls and also extending above and below said point but terminating at its upper edge below the liquid in said casing, whereby ingoing liquids will be conducted along the sides of the casing and diffused into the central part of the casing.

5. A septic tank comprising a cylindrical casing having inlet and outlet conduits spaced at opposite sides of the casing extending downwardly into the same, and opening therein at points below the maximum level of the liquid in the casing as determined by the outlet conduit, but above the bottom of the casing, and a baffle plate secured intermediate of its sides to and supported by the lower end of the inlet conduit so as to extend a short distance vertically above and below and at each side of the opening from the inlet into the casing but spaced from the casing walls whereby an ingoing liquid will be diffused to all parts of the casing.

6. A septic tank comprising a casing having an inlet and an outlet at points spaced apart horizontally around the casing, the inlet opening into the interior of the casing at a point below the maximum level of the liquid as determined by the outlet, and a baffle plate supported closely adjacent the opening from the inlet into the casing for directing a portion of the ingoing liquid closely along a side wall of the casing for some distance starting at the said inlet opening.

7. A septic tank comprising a cylindrical casing having inlet and outlet openings adjacent its side walls at horizontally spaced points, an arcuate plate disposed in the casing with its concave side facing the adjacent side wall of the casing on the interior thereof and extending from one of said openings downwardly, said arcuate plate being secured along its side edges to the side wall of the casing, and a baffle plate disposed in the interior of the casing adjacent the lower end of said arcuate plate and extending downwardly and sidewise in both directions from said lower end, the side edge of the baffle plate being spaced from said tank, whereby liquid passing through the conduit formed by said arcuate plate and the casing wall will be diffused in the casing and some of it directed closely along the sides of the casing.

FREDERICK E. WILSON.